(12) United States Patent
Yeom et al.

(10) Patent No.: US 12,349,294 B2
(45) Date of Patent: Jul. 1, 2025

(54) TERMINAL APPARATUS ASSEMBLY AND TERMINAL EQUIPMENT INCLUDING SAME

(71) Applicant: Suprema Inc., Seongnam-si (KR)

(72) Inventors: Junsun Yeom, Seongnam-si (KR); Taehoon Lee, Seongnam-si (KR)

(73) Assignee: Suprema Inc., Seongnam-si (KR)

( * ) Notice: Subject to any disclaimer, the term of this patent is extended or adjusted under 35 U.S.C. 154(b) by 209 days.

(21) Appl. No.: 18/181,356

(22) Filed: Mar. 9, 2023

(65) Prior Publication Data
US 2023/0292451 A1 Sep. 14, 2023

(30) Foreign Application Priority Data

Mar. 11, 2022 (KR) .................. 10-2022-0030439
Mar. 6, 2023 (KR) .................. 10-2023-0029140

(51) Int. Cl.
*H05K 5/02* (2006.01)

(52) U.S. Cl.
CPC ......... *H05K 5/0204* (2013.01); *H05K 5/0221* (2013.01)

(58) Field of Classification Search
None
See application file for complete search history.

(56) References Cited

U.S. PATENT DOCUMENTS

| | | | | |
|---|---|---|---|---|
| 5,873,446 A * | 2/1999 | Wei | .................. | G07F 9/06 232/16 |
| 8,648,264 B2 * | 2/2014 | Masumoto | .............. | H02G 3/14 220/281 |
| 10,135,191 B1 * | 11/2018 | Ahn | .................. | G06F 21/74 |
| 10,440,846 B2 * | 10/2019 | Kato | .................. | H05K 5/0017 |
| 10,492,317 B1 * | 11/2019 | Ho | .................. | H05K 7/023 |
| 10,687,433 B1 * | 6/2020 | Raic | .................. | H05K 7/1468 |
| 11,202,381 B2 * | 12/2021 | Miyake | .............. | H05K 5/0013 |
| 11,363,727 B1 * | 6/2022 | Yeom | .................. | F16M 11/041 |
| 11,363,730 B2 * | 6/2022 | Diekmann | .......... | H05K 5/0221 |

(Continued)

FOREIGN PATENT DOCUMENTS

| | | |
|---|---|---|
| CN | 209118966 U | 7/2019 |
| JP | S60-249827 A | 12/1985 |

(Continued)

OTHER PUBLICATIONS

Hamza Ghani, "Extended European Search Report for European Application No. 23161020.5", Jul. 27, 2023, EPO, Germany.

(Continued)

*Primary Examiner* — Xanthia C Relford
(74) *Attorney, Agent, or Firm* — Bridgeway IP Law Group, PLLC; Jihun Kim

(57) ABSTRACT

A terminal apparatus assembly include: a terminal configured to be selectively fastened to a bracket; and a locking unit including an inner locking part configured to be movable with respect to the bracket such that the terminal and the bracket are fastened to or separated from each other. The inner locking part is configured to move in one direction toward the bracket or the terminal when at least a portion is pressed by an external force and to move in a direction opposite to the one direction by a restoring force when the pressing is released.

18 Claims, 11 Drawing Sheets

(56) References Cited

U.S. PATENT DOCUMENTS

| | | | |
|---|---|---|---|
| 11,624,210 B2* | 4/2023 | Rathore | G01R 22/065 |
| | | | 70/164 |
| 11,815,125 B2* | 11/2023 | Borrego Lebrato | F16B 5/0664 |
| 11,879,485 B2* | 1/2024 | Bachu | F16B 2/245 |
| 2004/0005803 A1* | 1/2004 | Stockhaus | H01R 13/6272 |
| | | | 439/345 |
| 2015/0382497 A1* | 12/2015 | Kawamura | H05K 7/14 |
| | | | 361/728 |
| 2017/0238433 A1* | 8/2017 | Jiang | H05K 5/0221 |
| | | | 174/535 |
| 2018/0213661 A1* | 7/2018 | Morihara | H05K 7/1427 |
| 2018/0310421 A1* | 10/2018 | Kato | H05K 5/0247 |
| 2019/0348824 A1* | 11/2019 | Ikeda | H02G 3/0418 |
| 2020/0068723 A1* | 2/2020 | Miklosi | H05K 5/0013 |
| 2020/0136360 A1* | 4/2020 | Yoshida | H05K 9/0064 |
| 2021/0337680 A1 | 10/2021 | Yeom et al. | |

FOREIGN PATENT DOCUMENTS

| | | |
|---|---|---|
| JP | H08-334107 A | 12/1996 |
| JP | H10-14637 A | 1/1998 |
| JP | 2012-191081 A | 10/2012 |
| JP | 2012-248750 A | 12/2012 |
| TW | 202009412 A | 3/2020 |

OTHER PUBLICATIONS

Takashi Watahiki, "First Office Action for Japanese Application No. 2023-037556", Jan. 23, 2024, JPO, Japan.

* cited by examiner

TERMINAL APPARATUS ASSEMBLY AND TERMINAL EQUIPMENT INCLUDING SAME

TECHNICAL FIELD

The present disclosure relates to a terminal apparatus assembly and terminal equipment including the same.

BACKGROUND

In general, a terminal is a device connected to a communication circuit in a data transmission device or the like and used to input or output data through the communication circuit.

As such a terminal, for example, there is a fingerprint recognition device in which, when a user touches a fingerprint portion of a finger on a fingerprint collection surface, light from a light source is reflected and absorbed by valleys and ridges of the fingerprint, the reflected light is incident on a prism to form an image on a lens system, and light formed as an image on the lens system is detected through an image sensor. A fingerprint detected by such a fingerprint recognition device is sent to an image processor through the image sensor, and the image processor compares the detected fingerprint with registered fingerprints to recognize whether it is a registered fingerprint.

If a terminal including such a fingerprint recognition device, face recognition device, card terminal device, and the like is arbitrarily and illegally disassembled by an unauthorized outsider, not only information on the main design of the terminal but also important data stored in the terminal may be tampered in a hardware or software manner.

Meanwhile, such a terminal is mainly supported and fixed by a bracket disposed on a wall adjacent to an entrance door. A conventional terminal has been fixed by a bracket using a screw fastening method. However, this screw fastening method requires an additional tool (for example, a screwdriver or the like) to mount a terminal on a bracket and takes a long time to fix the terminal, which decreases the convenience of installation of the terminal.

SUMMARY

One embodiment of the present disclosure devised in view of the above background provides terminal equipment capable of conveniently fixing a terminal to a bracket.

In accordance with a first embodiment of the present disclosure, there is provided a terminal apparatus assembly including: a terminal configured to be selectively fastened to a bracket; and a locking unit including an inner locking part configured to be movable with respect to the bracket such that the terminal and the bracket are fastened to or separated from each other, wherein the inner locking part is configured to move in one direction toward the bracket or the terminal when at least a portion is pressed by an external force and to move in a direction opposite to the one direction by a restoring force when the pressing is released.

The inner locking part may include: a first inner locker protruding from the terminal in the one direction; and a second inner locker configured to be engaged with the first inner locker, wherein the terminal and the bracket are fastened to each other when the second inner locker is engaged with the first inner locker, wherein the second inner locker is configured such that an upper portion thereof is supported by the bracket, a lower portion thereof is disposed to be spaced apart from the bracket in the one direction, the second inner locker being movable toward the bracket when the lower portion is pressed by either the external force or the first inner locker and being movable in a direction away from the bracket when pressing by the external force is released.

The second inner locker may be a leaf spring.

The inner locking part may be in any one of a locked state in which the terminal and the bracket are fastened to each other and an unlocked state in which the terminal is separable from the bracket, and the second inner locker may be disposed such that a lower end thereof is in contact with an upper surface of the first inner locker in the locked state and the lower end thereof is pressed against the bracket by the external force to be spaced apart from the first inner locker in the unlocked state.

The inner locking part may be in a locking introduction state in which the terminal is movable in a vertical direction with respect to the bracket, the terminal may be disposed higher in the locking introduction state than in the locked state and the unlocked state, and the first inner locker may come into contact with the lower portion of the second inner locker and press the lower portion of the second inner locker against the bracket in the locking instruction state.

A length of the first inner locker in the one direction may decrease as it goes downward.

The terminal may include: a frame supporting the second inner locker; and a guide part protruding from the frame in the one direction to guide a direction of movement of an opener for pressing the second inner locker, and the guide part may be disposed above the second inner locker.

The second inner locker may protrude more than the guide part.

The guide part may include a plurality of guide parts, and the plurality of guide parts are spaced apart from each other in a lateral direction to guide the direction of movement of the opener.

The terminal may further include a tampering part disposed between the plurality of guide parts.

The inner locking part may include: a first inner locker supported by the terminal to be movable in the one direction; and a second inner locker supported by the bracket, wherein the second inner locker is engaged with the first inner locker such that the terminal and the bracket are fastened to each other, and the first inner locker may include: an inner locker member moving toward the terminal when pressed by the external force; and an inner elastic member compressed against the terminal by the inner locker member moving by being pressed and expanded by a restoring force when the pressing is released to move the inner locker member in a direction away from the terminal.

The inner locking part may be in any one of a locked state in which the terminal and the bracket are fastened to each other and an unlocked state in which the terminal is separable from the bracket, and the inner locker member may be disposed such that an upper end of the inner locker member comes into contact with a lower surface of the second inner locker in the locked state, and in the unlocked state, the inner locker member is pressed against the terminal by the external force and the upper end of the inner locker member is spaced apart from the lower surface of the second inner locker and compresses the inner elastic member.

The inner locker member may include a guide part recessed from an outer surface toward the terminal and extending in a vertical direction to guide vertical movement of the opener for pressing the inner locker member.

An inner surface of the guide part may include an inclined surface inclined such that a lower end of the inclined surface is further spaced apart from the terminal than an upper end of the inclined surface.

The second inner locker may include a plurality of second inner lockers disposed spaced apart from each other in a lateral direction, and the inclined surface may be disposed between the plurality of second inner lockers when viewed in the vertical direction.

The inner locker member may be disposed at a position where a distance between the upper end of the inclined surface and the terminal is shorter than a distance between the second inner locker and the terminal in the locked state.

The inner locking part may include: a first inner locker at least a part of which is supported by the terminal to be movable in the one direction by the external force; and a second inner locker engaged with the first inner locker such that the terminal and the bracket are fastened to each other, wherein the first inner locker may be configured such that the lower part of the first inner locker is supported by the terminal, and the upper part of the first inner locker is disposed to be spaced apart from the terminal in the one direction, the first inner locker being movable toward the terminal when the upper part of the first inner locker is pressed by any one of the external force and the second inner locker and being movable in a direction away from the terminal when pressing is released.

The first inner locker may be a leaf spring.

The inner locking part may be in any one of a locked state in which the terminal and the bracket are fastened to each other and an unlocked state in which the terminal is separable from the bracket, and an upper end of the first inner locker may be in contact with a lower end of the second inner locker in the locked state, and the first inner locker may be pressed by an external force against the terminal and the upper end of the first inner locker may be spaced apart from the second inner locker in the unlocked state.

A guide part recessed toward the terminal to form a stepped portion with respect to the first inner locker and guiding a vertical movement of the opener for pressing the first inner locker may be disposed at the upper part of the first inner locker.

The terminal may include: a frame having an opener hole formed at an upper end thereof; and a hole cover for opening and closing the opener hole, wherein the hole cover may include: a cover body rotatably disposed at the upper end of the frame in a lateral direction perpendicular to the one direction to open and close the opener hole; and a torsion spring for providing a restoring force for rotating the cover body such that the cover body closes the opener hole.

In accordance with a second embodiment of the present disclosure, there is provided a terminal equipment including: a bracket installed on a wall; and a terminal apparatus, wherein the terminal apparatus includes: a terminal configured to be selectively fastened to the bracket; and a locking unit including an inner locking part configured to be movable with respect to the bracket such that the terminal and the bracket are fastened to or separated from each other, wherein the inner locking part is configured to move in one direction toward the bracket or the terminal when at least a portion is pressed and to move in a direction opposite to the one direction by a restoring force when the pressing is released.

The locking unit may further include a first edge locker disposed on the terminal to prevent the terminal from moving in a horizontal direction with respect to the bracket when the terminal and the bracket are fastened to each other, and a second edge locker disposed on the bracket and engaged with the first edge locker.

The terminal may include: a body frame supporting at least a portion of the inner locking part; and a side frame extending and disposed along an edge of the body frame, wherein the first edge locker protrudes from an inner surface of the side frame in a lateral direction, the second edge locker includes: an edge step protruding from an edge of the bracket in the one direction and extending in a vertical direction; and an edge protrusion protruding upward from an upper surface of the edge step, and when the terminal and the bracket are fastened to each other, a lower surface of the first edge locker comes into contact with the edge step and the first edge locker is blocked from moving in the one direction by the edge protrusion.

The terminal equipment according to an embodiment of the present disclosure has an effect of conveniently fixing a terminal to a bracket.

DETAILED DESCRIPTION

Hereinafter, a configuration and operation according to an embodiment of the present disclosure will be described in detail with reference to the accompanying drawings.

Further, in describing the present disclosure, detailed descriptions of known configurations or functions may be omitted to clarify the present disclosure.

When an element is referred to as being 'connected' to, 'supported' by, 'transferred' to, 'supplied' to, or 'coupled' to another element, it should be understood that the element may be directly connected to, supported by, transferred to, supplied to, or coupled to the other element, but that other elements may exist in the middle.

The terms used in the present disclosure are only used for describing specific embodiments, and are not intended to limit the present disclosure. Singular expressions include plural expressions unless the context clearly indicates otherwise.

Terms including ordinal numbers, such as first and second, may be used for describing various elements, but the corresponding elements are not limited by these terms. These terms are only used for the purpose of distinguishing one element from another element.

In the present specification, it is to be understood that the terms such as "including" are intended to indicate the existence of the certain features, areas, integers, steps, actions, elements, combinations, and/or groups thereof disclosed in the specification, and are not intended to preclude the possibility that one or more other certain features, areas, integers, steps, actions, elements, combinations, and/or groups thereof may exist or may be added.

Further, in the present disclosure, it is to be noted that expressions, such as the upper side, the lower side, and the upper surface, are described based on the illustration of drawings, but may be modified if directions of corresponding objects are changed. In addition, the up and down direction, the front and back direction, and the left and right direction in the present specification may be understood based on coordinate axes shown in FIGS. 1 to 11.

Hereinafter, a specific configuration of terminal equipment 1 according to a first embodiment of the present disclosure will be described with reference to the drawings.

Figure 1:
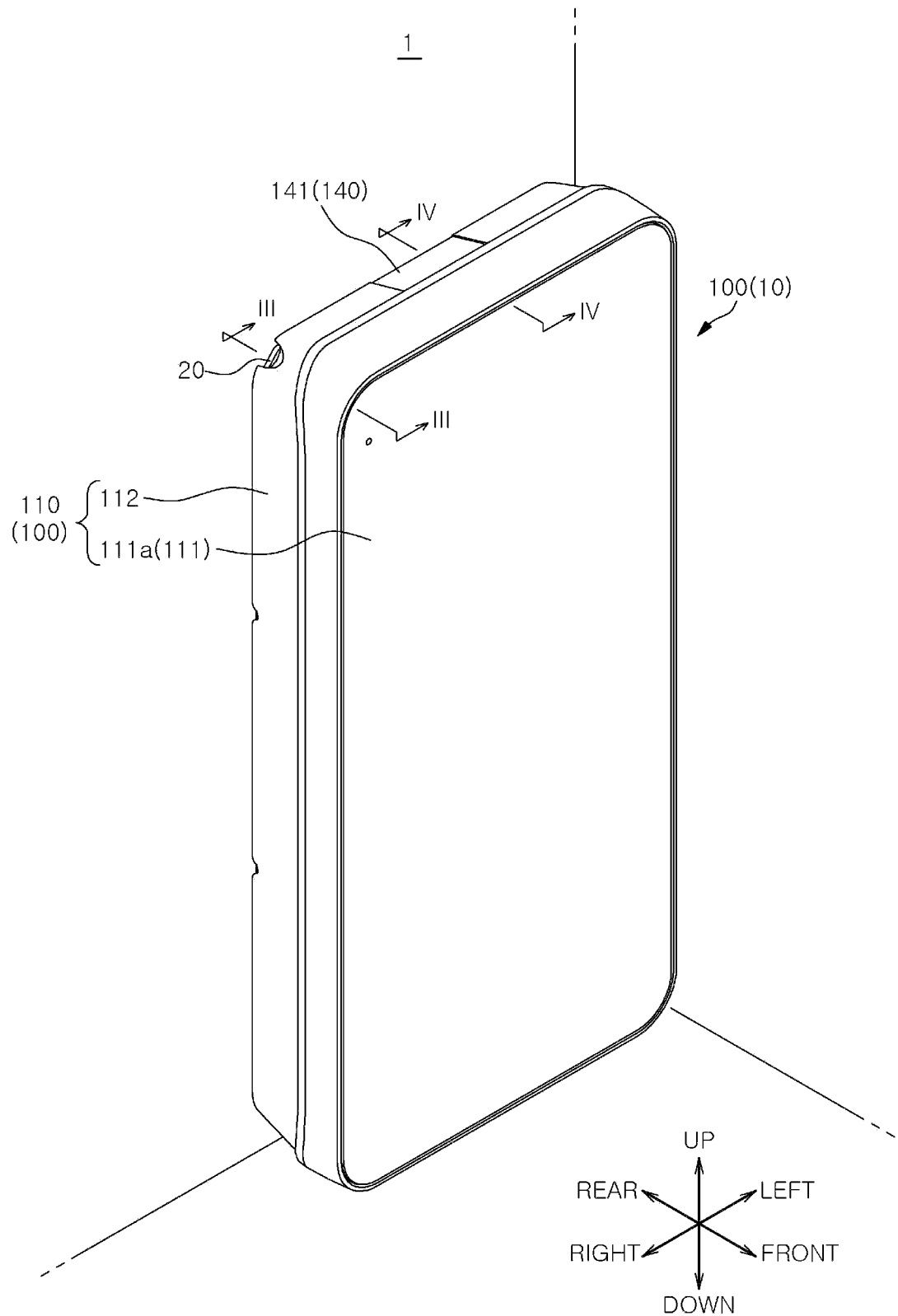
FIG. 1 is a perspective view of terminal equipment according to a first embodiment of the present disclosure.
Figure 2:
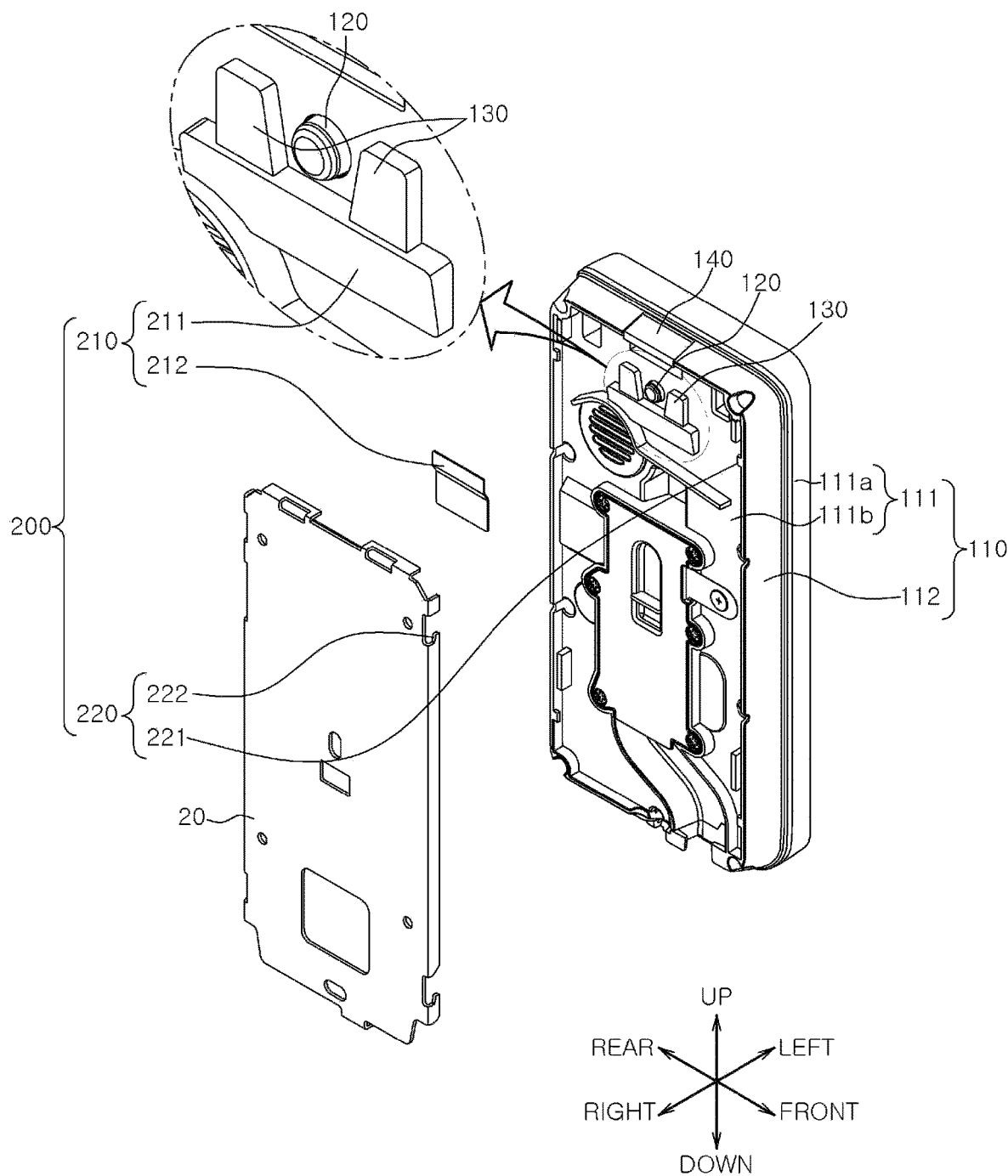
FIG. 2 is an exploded perspective view of the terminal equipment according to the first embodiment of the present disclosure.
Figure 3:
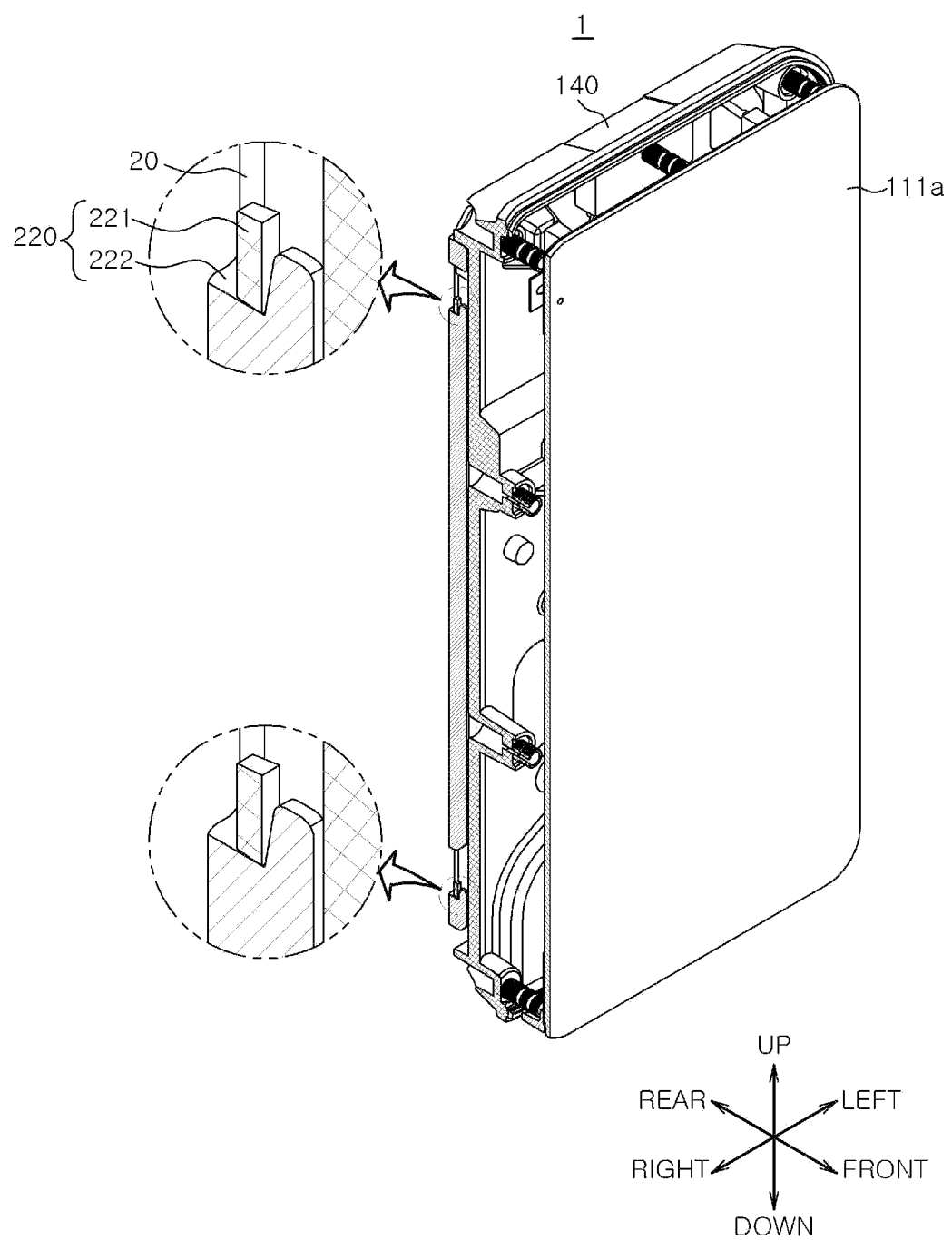
FIG. 3 is a cross-sectional perspective view taken along line of FIG. 1.
Figure 4:
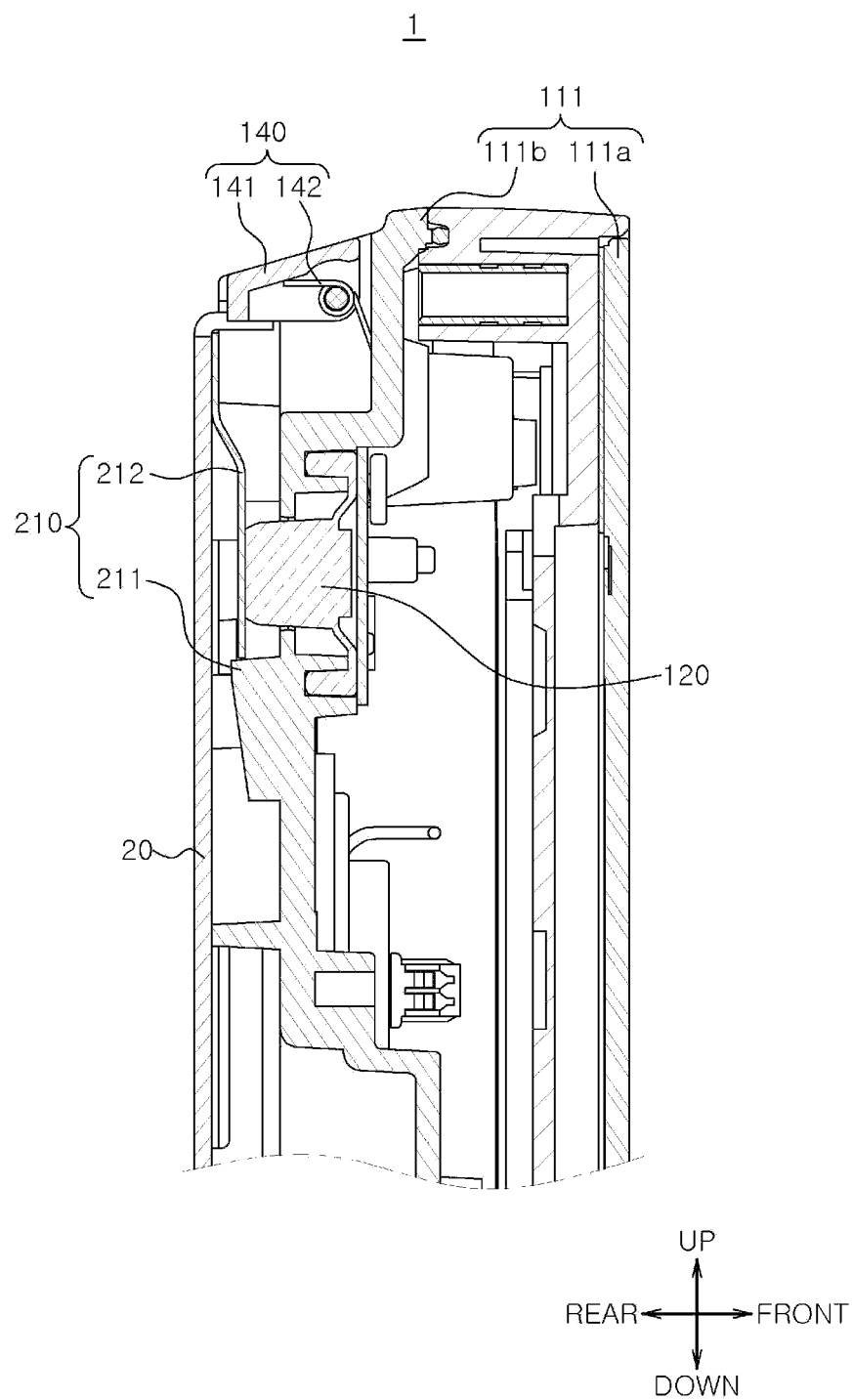
FIG. 4 is a longitudinal cross-sectional view taken along line IV-IV of FIG. 1.
Figure 5:
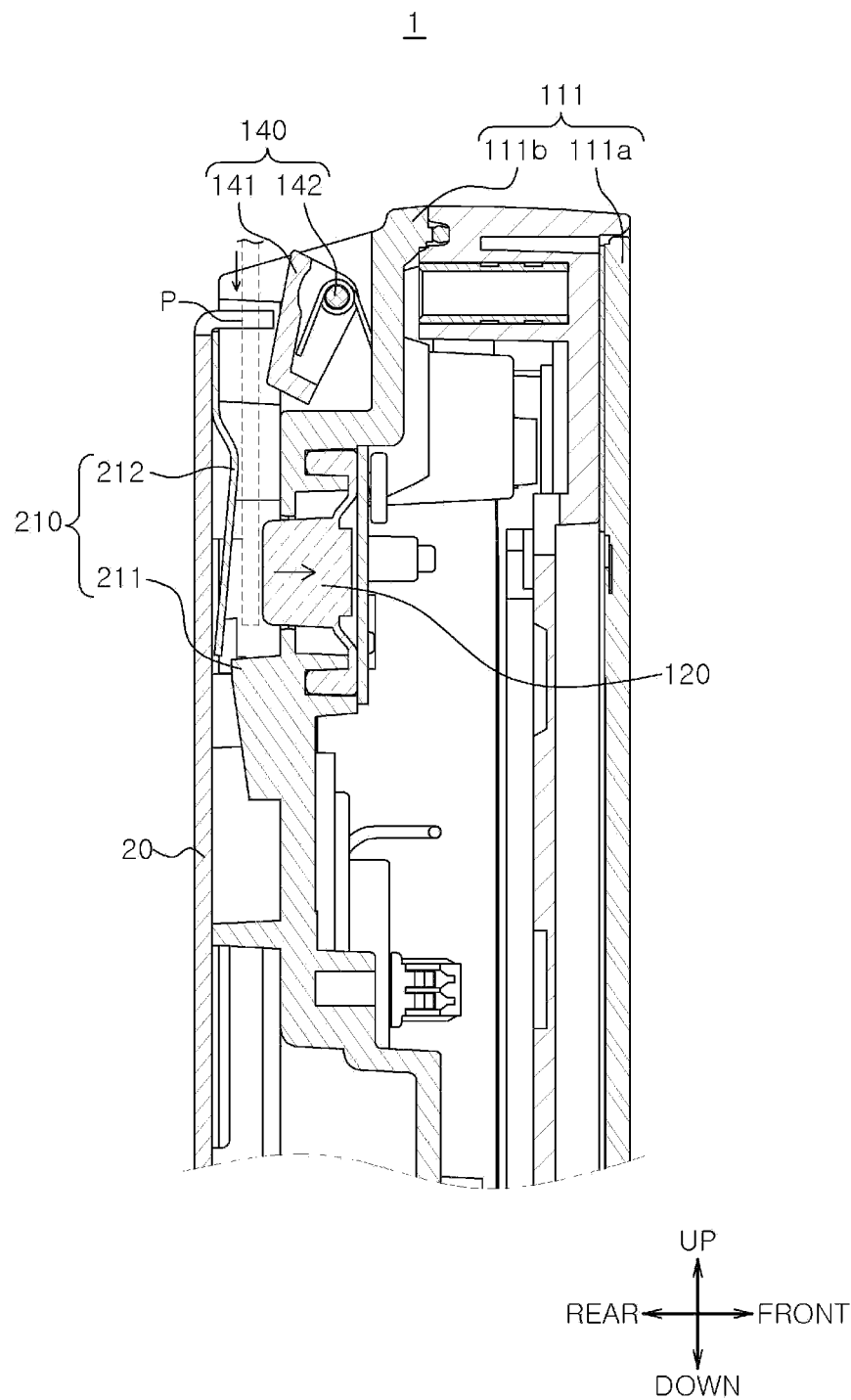
FIG. 5 is a longitudinal cross-sectional view showing a state in which an inner locking part of FIG. 4 is in an unlocked state.
Figure 6:
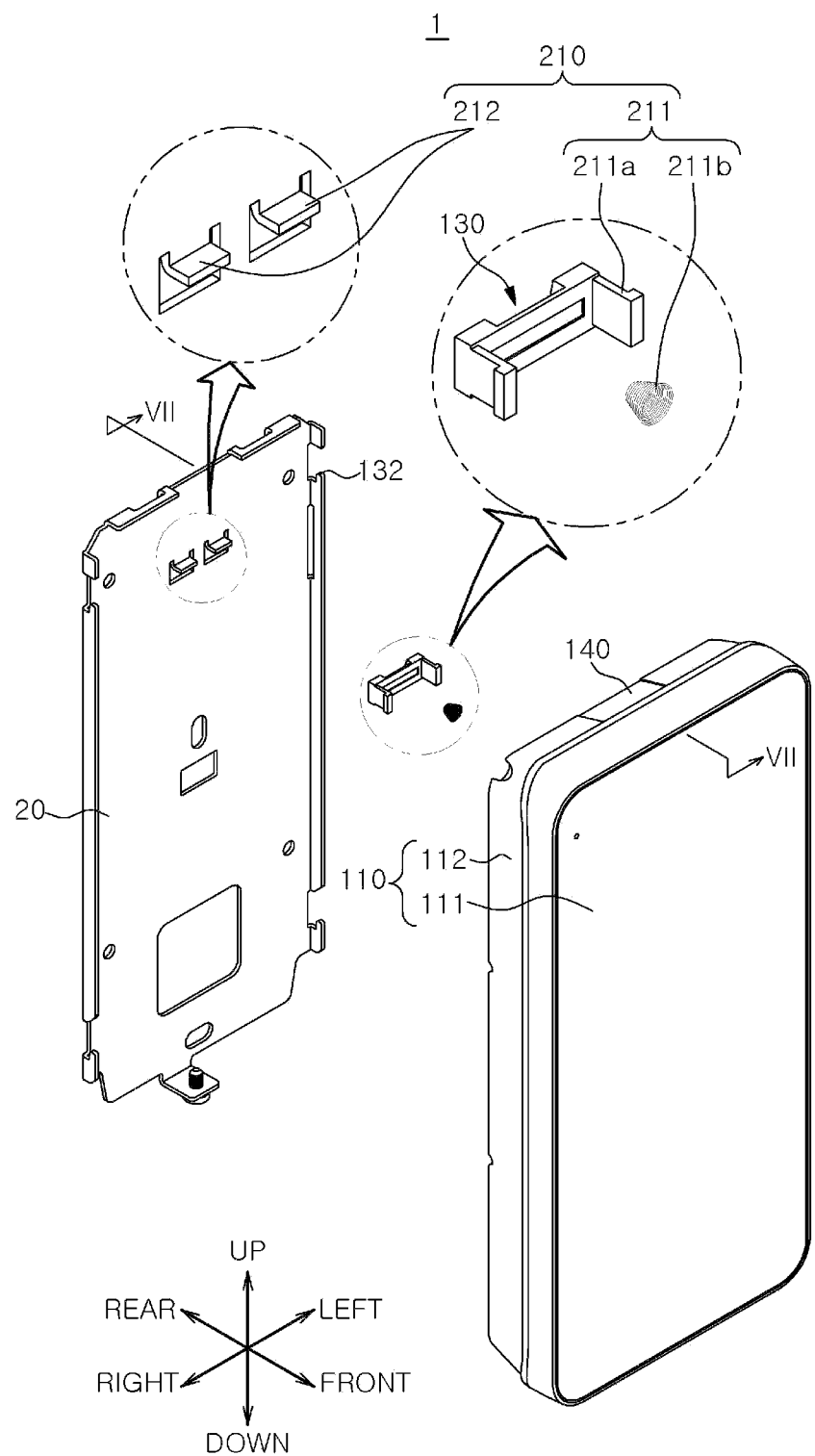
FIG. 6 is an exploded perspective view of terminal equipment according to a second embodiment of the present disclosure.
Figure 7:
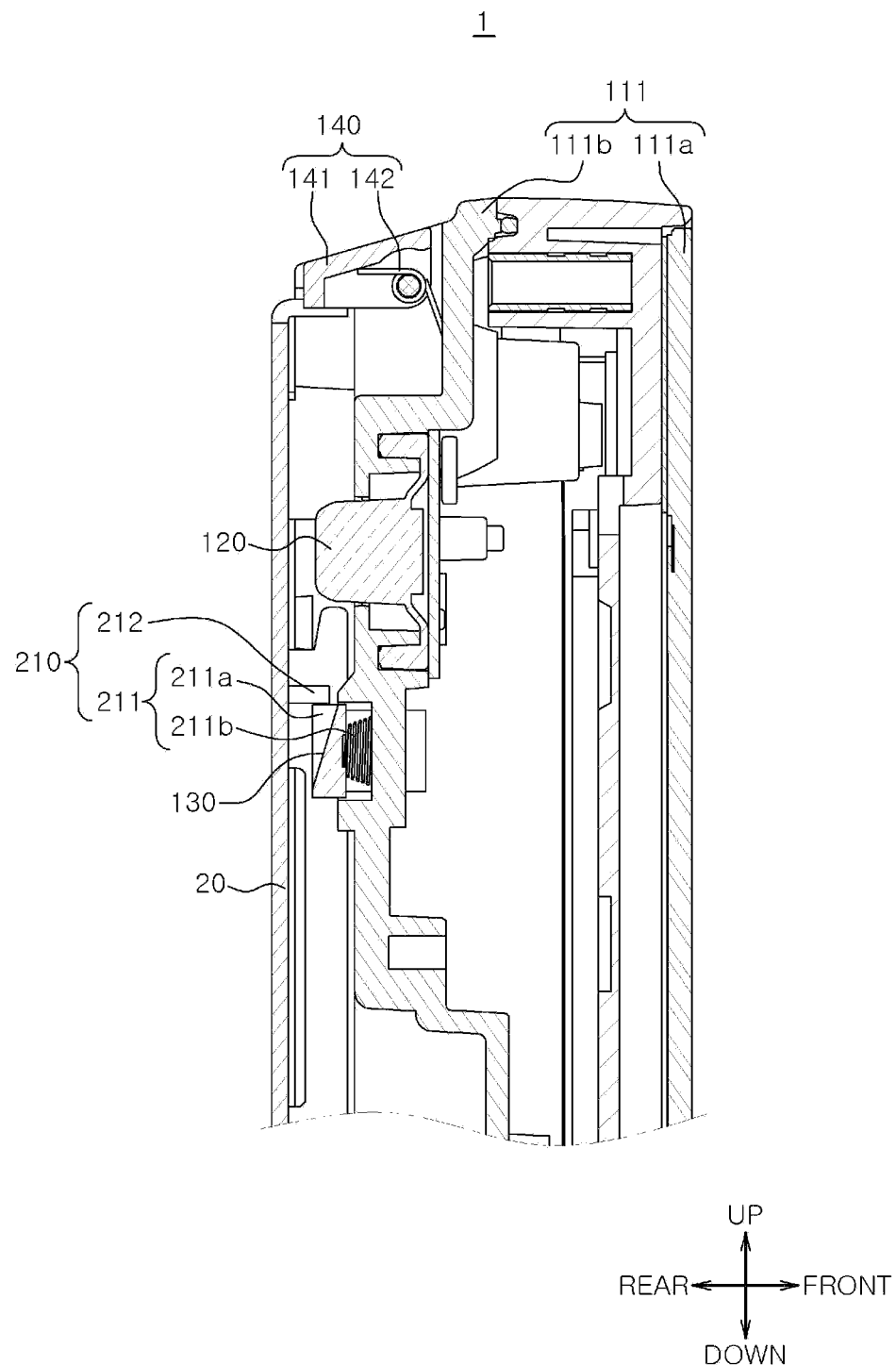
FIG. 7 is a longitudinal cross-sectional view taken along line VII-VII of FIG. 6.
Figure 8:
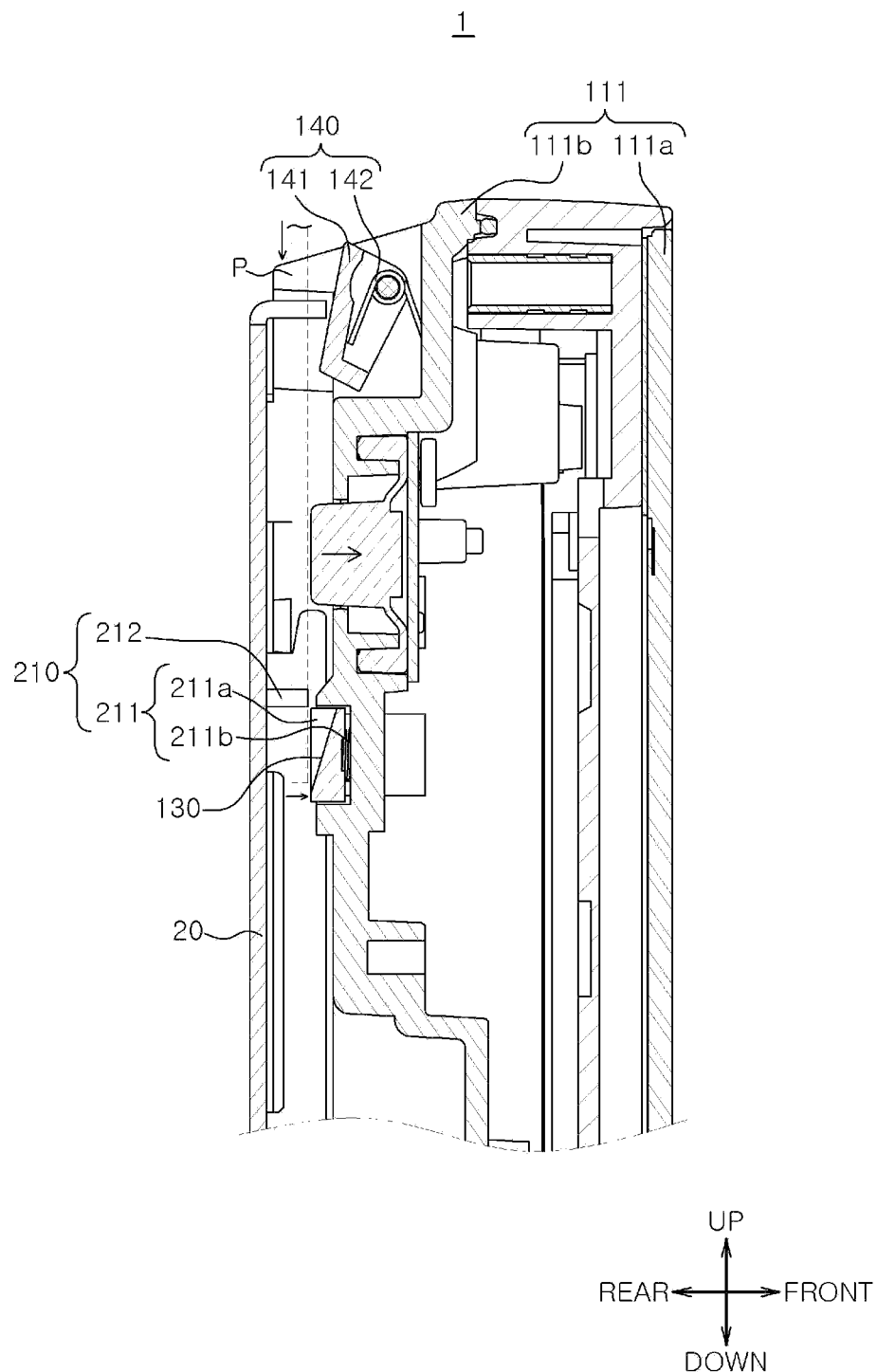
FIG. 8 is a longitudinal cross-sectional view showing a state in which an inner locking part of FIG. 7 in an unlocked state.
Figure 9:
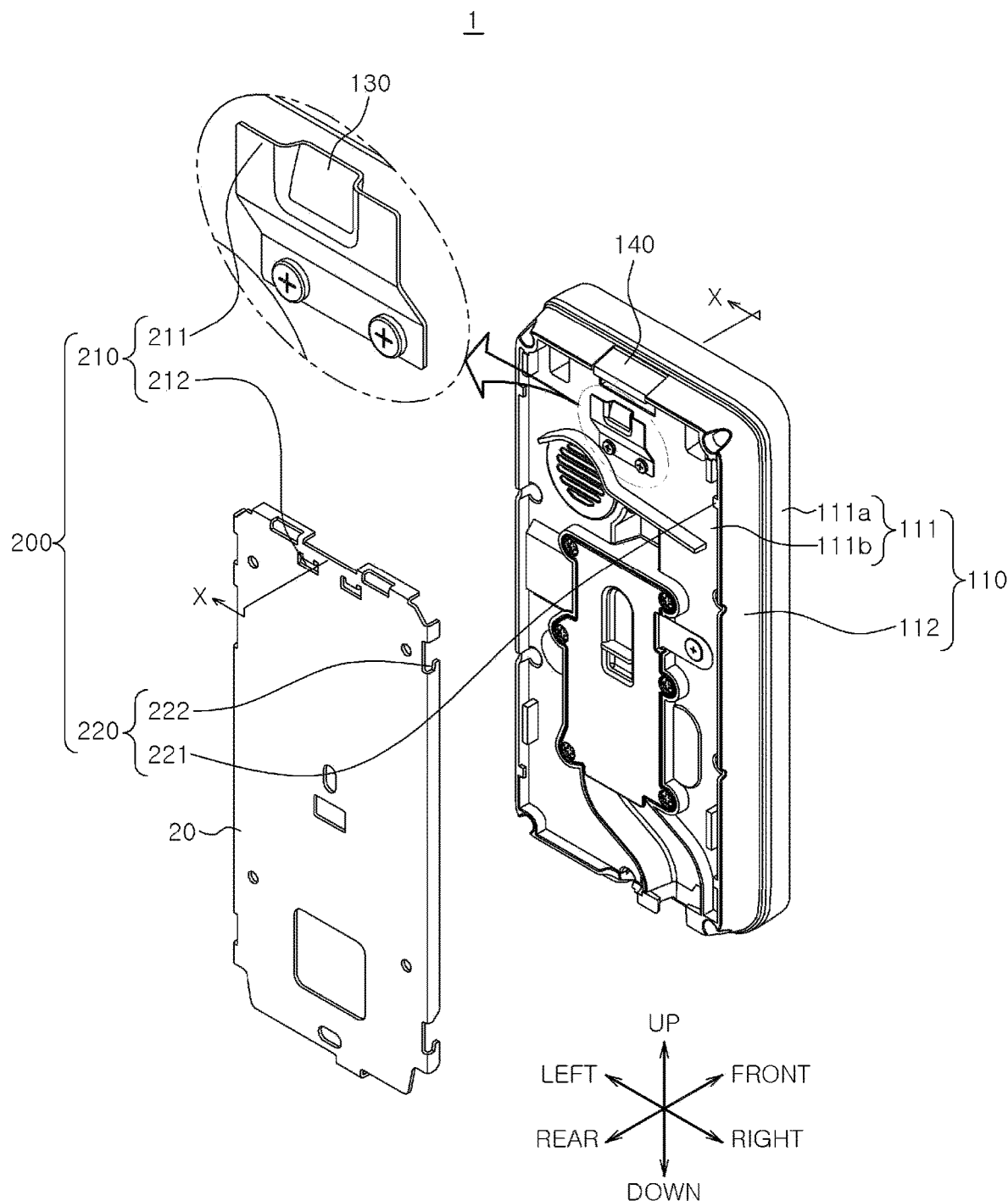
FIG. 9 is an exploded perspective view of terminal equipment according to a third embodiment of the present disclosure.
Figure 10:
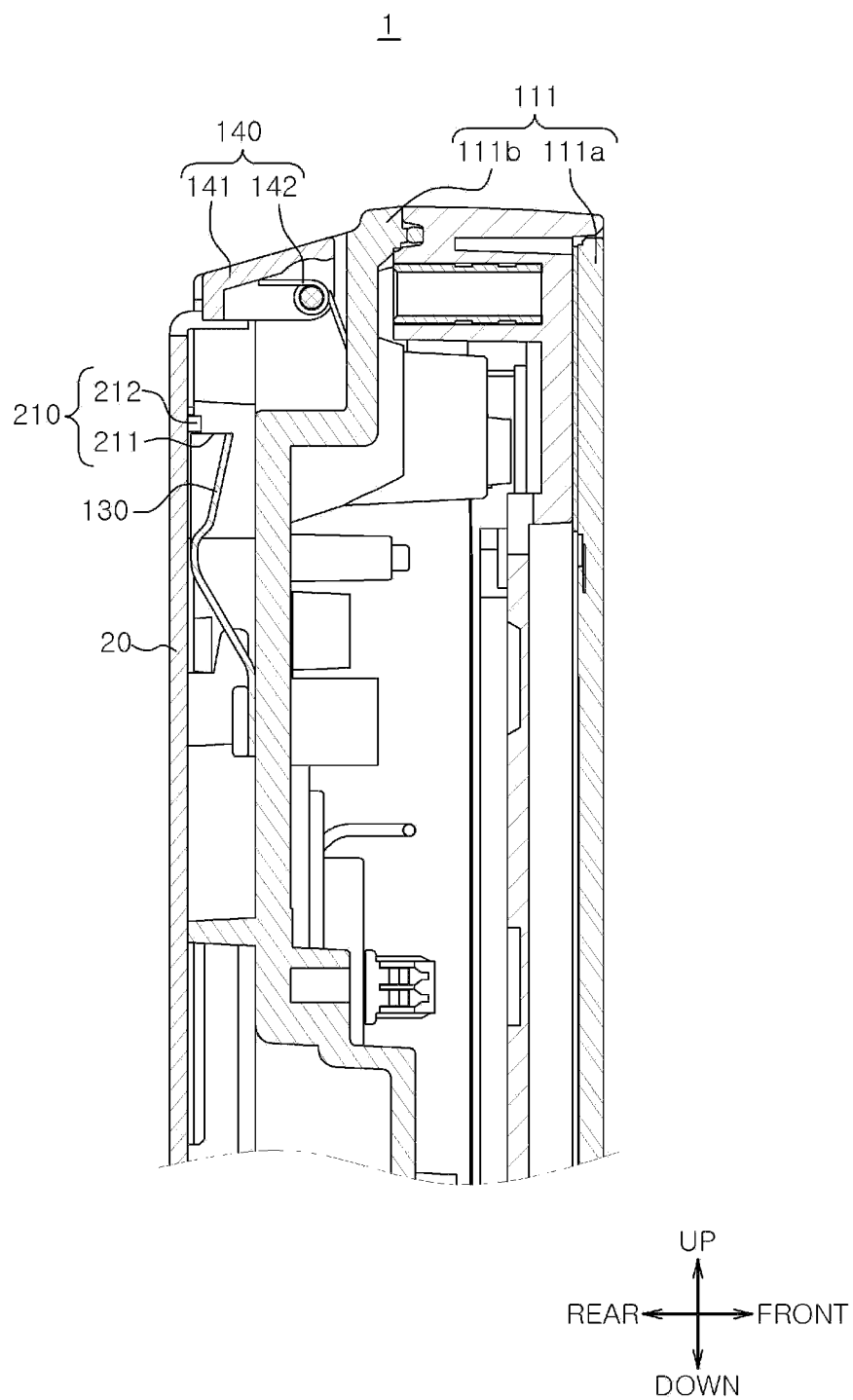
FIG. 10 is a longitudinal cross-sectional view taken along line X-X of FIG. 9.
Figure 11:
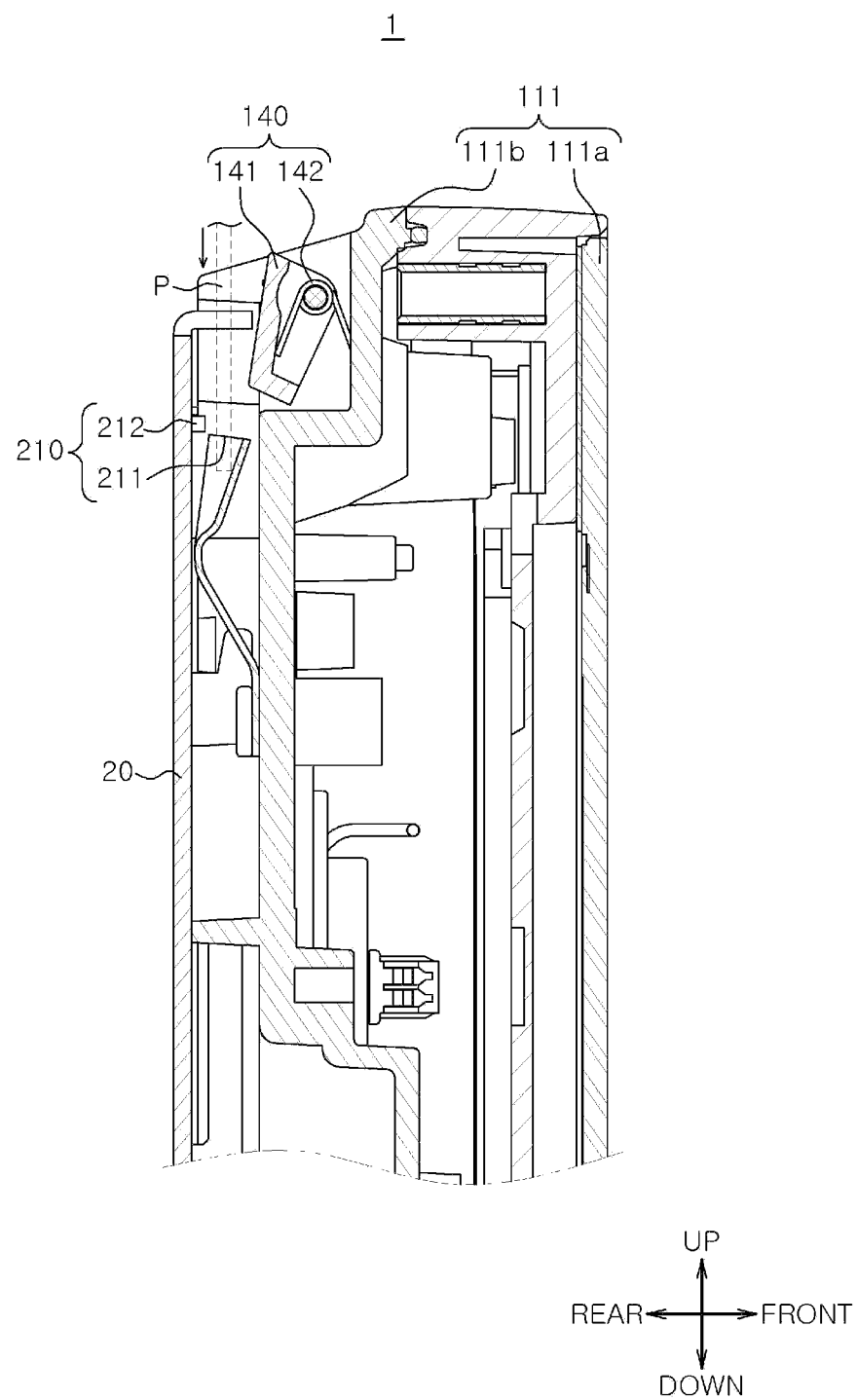
FIG. 11 is a longitudinal sectional view showing a state in which an inner locking part of FIG. 10 is in an unlocked state.

Referring to FIG. 1, the terminal equipment 1 according to the first embodiment of the present disclosure may include a terminal apparatus assembly 10 and a bracket 20. The terminal apparatus assembly 10 may include a terminal 100 and a locking unit 200.

The terminal 100 may be detachably connected to the bracket 20. For example, the terminal 100 may be fixed to the bracket 20 through the locking unit 200. The terminal 100 may include a frame 110, a tampering part 120, a guide part 130, and a hole cover 140.

The frame 110 may support the tampering part 120, the guide part 130, and the hole cover 140. In addition, the frame 110 may support at least a portion of an inner locking part 210 of the locking unit 200, which will be described later. The frame 110 may be a housing that forms the exterior of the terminal 100. An opener hole through which an opener P can pass may be formed at an upper end of the frame 110. The frame 110 may include a body frame 111 and a side frame 112.

The body frame 111 may include an outer frame 111*a* and an inner frame 111*b*. The outer frame 111*a* may form the front appearance of the terminal 100. The inner frame 111*b* may be disposed inside the terminal 100. The inner frame 111*b* may be connected to the outer frame 111*a* and the side frame 112.

The side frame 112 may extend along the edge of the body frame 111. In other words, it may be arranged to surround the edge of the inner frame 111*b*. The side frame 112 may form the appearance of the top, bottom and side surfaces of the terminal 100.

When separation between the bracket 20 and the terminal 100 is detected, the tampering part 120 may activate a tamper function of the terminal 100. For example, the tampering part 120 may activate the tamper function of the terminal 100 when contact with a second inner locker 212 which will be described later is released. As another example, the tampering part 120 activates the tamper function of the terminal 100 when the opener P (e.g., a sharp awl, a screwdriver, a shaft pin, or the like) capable of unlocking the inner locking part 210 is detected. The tampering part 120 may be disposed adjacent to the inner locking part 210 which will be described later.

When the opener P is inserted into the frame 110, the guide part 130 may guide the movement of the opener P toward the second inner locker 212. For example, when the opener P is inserted into the frame 110, the guide part 130 may guide the movement of the opener P such that the opener P presses the second inner locker 212. A plurality of guide parts 130 may be provided and may have a shape protruding backward from the inner frame 111*b*. In addition, the plurality of guide parts 130 may be spaced apart from each other in the lateral direction to guide the movement of the opener P. In other words, the opener P may be moved vertically between the plurality of guide parts 130. In addition, a width between the plurality of guide parts 130 in a lateral direction thereof becomes narrower as it goes downward. The tampering part 120 may be positioned between the plurality of guide parts 130. The hole cover 140 may open and close an opener hole formed at the center of the upper end of the side frame 112. The opener hole may be a through-hole penetrating the center of the upper end of the side frame 112 in a vertical direction. The hole cover 140 may include a cover body 141 and a torsion spring 142.

The cover body 141 may be rotatably connected to the center of the upper end of the side frame 112. For example, the cover body 141 may be rotated with respect to the side frame 112 about a rotation axis extending in the lateral direction. In other words, the cover body 141 may open the opener hole when rotated downward about the rotation axis and close the opener hole when rotated upward about the rotation axis.

When the cover body 141 is rotated with respect to the side frame 112, the torsion spring 142 applies a rotation restoring force to the cover body 141 in the opposite direction to the direction in which the cover body 141 is rotated. One side of the torsion spring 142 may be connected to the inner frame 111*b* and the other side of the torsion spring 142 may be connected to the cover body 141.

The locking unit 200 may selectively couple the terminal 100 and the bracket 20. In other words, the terminal 100 can be coupled to or separated from the bracket 20 by the locking unit 200. The locking unit 200 may include an inner locking part 210 and an edge locking part 220.

The inner locking part 210 may be configured such that at least a portion thereof is moved in one direction toward the bracket 20 or the terminal 100 by being pressed and moved in the opposite direction to one direction by a restoring force when pressing is released. For example, at least a portion of the inner locking part 210 may be moved backward by being pressed by the opener P or may be moved forward by its own restoring force when pressing is released. The inner locking part 210 may include a first inner locker 211 and a second inner locker 212 that can be selectively engaged with each other.

The first inner locker 211 may protrude backward from the terminal 100 to be engaged with the second inner locker 212. In other words, it may have a stepped shape protruding backward from the inner frame 111*b*. The first inner locker 211 may have a shape inclined forward as it goes downward. For example, the first inner locker 211 may have a shape in which the length protruding backward from the inner frame 111*b* gradually decreases as it goes downward. The first inner locker 211 may be disposed lower than the guide part 130. In addition, the first inner locker 211 may be formed to extend in the lateral direction. For example, the length of the first inner locker 211 in the lateral direction may be greater than the length of the second inner locker 212 in the lateral direction. In addition, the upper surface of the first inner locker 211 may be formed to extend in the lateral direction to be connected to the plurality of guide parts 130. In addition, the first inner locker 211 may more protrude backward than the guide part 130. When the inner locking part 210 is in a locked state which will be described later, the upper surface of the first inner locker 211 is in contact with the second inner locker 212 such that the first inner locker 211 and the second inner locker 212 are arranged.

The second inner locker 212 may be supported on the front surface of the bracket 20 to be engaged with the first inner locker 211. In other words, the second inner locker 212 may be disposed such that an upper portion thereof is supported on the front of the bracket 20 and a lower portion thereof is spaced apart from the bracket 20. For example, the second inner locker 212 may be a leaf spring.

The inner locking part 210 may be in any one of a locked state in which the terminal 100 and the bracket 20 are coupled, an unlocked state in which the terminal 100 is detachable from the bracket 20, and a locking introduction state in which the terminal 100 can be moved in the vertical direction with respect to the bracket 20.

The locking introduction state may be defined as a state in which the terminal 100 and the bracket 20 are in close contact with each other in a front and rear direction and the second inner locker 212 is pressed against the terminal 100 by the first inner locker 211. In the locking introduction state, the terminal 100 can be positioned higher than in the locked state and the unlocked state. In the locking introduction state, the terminal 100 can move up and down with respect to the bracket 20, and when moved downward, the first inner locker 211 and the second inner locker 212 are engaged and thus the terminal 100 can be switched to the locked state. Further, in the locking introduction state, the first inner locker 211 comes into contact with the lower portion of the second inner locker 212 to press the lower portion of the second inner locker 212 against the bracket 20.

The locked state may be defined as a state in which the first inner locker 211 and the second inner locker 212 are engaged with each other. The position of the terminal 100 in the locked state may be lower than the position in the locking introduction state. In the locked state, the second inner locker 212 can be disposed above the first inner locker 211. In other words, the lower end of the second inner locker 212 is in contact with the upper surface of the first inner locker 211 to be engaged with the first inner locker 211 in the locked state. In this locked state, upward movement of the first inner locker 211 can be blocked by the second inner locker 212.

The unlocked state may be defined as a state in which engagement between the first inner locker 211 and the second inner locker 212 is released. In other words, in the unlocked state, the terminal 100 can be in a state in which it can be moved upward with respect to the bracket 20. In the unlocked state, the second inner locker 212 can be pressed against the bracket 20 by the opener P. In this unlocked state, the lower end of the second inner locker 212 is pressed against the bracket 20 by the opener P and thus it can be spaced apart from the first inner locker 211. In other words, in the unlocked state, the second inner locker 212 can be in an upwardly movable state.

When the terminal 100 moves downward with respect to the bracket 20 by a predetermined distance from when the inner locking part 210 is in the locking introduction state, the inner locking part 210 may be in the locked state. When the inner locking part 210 is in the locked state, upward movement of the terminal 100 with respect to the bracket 20 can be blocked. Further, when the inner locking part 210 is in the unlocked state, the terminal 100 can be allowed to move upward with respect to the bracket 20. In other words, when the terminal 100 moves upward in the unlocked state, the locked state can switch to the locking introduction state.

The edge locking part 220 can block movement of the terminal 100 with respect to the bracket 20 in a horizontal direction when the terminal 100 and the bracket 20 are coupled. In other words, the edge locking part 220 can block the terminal 100 from moving forward with respect to the bracket 20 in the locked state and the unlocked state. A plurality of edge locking parts 220 may be provided. The plurality of edge locking parts 220 may be spaced apart in the vertical and horizontal directions. The edge locking part 220 may include a first edge locker 221 and a second edge locker 222 that can be engaged with each other.

The first edge locker 221 is disposed on the terminal 100 and may be engaged with the second edge locker 222 in the locked state and the unlocked state. The first edge locker 221 may protrude from the inner surface of the side frame 112 in the lateral direction. For example, the first edge locker 221 may be a protrusion protruding inward from the inner surface of the side frame 112.

The second edge locker 222 can block movement of the terminal 100 with respect to the bracket 20 in the horizontal direction when the inner locking part 210 is in the locked state or unlocked state. The second edge locker 222 may have a hook shape that can be selectively engaged with the first edge locker 221. The second edge locker 222 may include an edge step and an edge protrusion.

The edge step may protrude forward from the edge of the bracket 20. In addition, the edge step may extend in the vertical direction along the edge of the bracket 20. The edge step may be disposed to face the lower surface of the first edge locker 221 when the inner locking part 210 is in the locking introduction state. In other words, the edge step may be disposed above the first edge locker 221 when the inner locking part 210 is in the locking introduction state. The edge step may be placed in contact with the lower surface of the first edge locker 221 when the inner locking part 210 is in the locked state. The edge step can block the terminal 100 from moving downward with respect to the bracket 20 when the inner locking part 210 is in the locked state and the unlocked state.

The edge protrusion may be disposed on the front side of the edge step and may have a shape extending upward. In other words, the edge protrusion may protrude upward from the upper surface of the edge step. The edge protrusion may be vertically spaced apart from the first edge locker 221 when the inner locking part 210 is in the locking introduction state. In addition, the edge protrusion can block the first edge locker from moving forward when the inner locking part 210 is in the locked state. In other words, the edge protrusion can block the terminal 100 from moving forward with respect to the bracket 20. An inclined surface may be formed on the rear surface of the edge protrusion. The inclined surface may have a shape inclined forward. For example, the inclined surface may have an inclined shape such that the upper end is disposed more forward than the lower end.

The lower end of the edge protrusion may be disposed adjacent to the first edge locker 221 when the inner locking part 210 is in the locked state. In addition, when the inner locking part 210 is in the locked state, the upper end of the edge protrusion may be spaced apart from the inside locking part 210 in the front and rear direction. For example, the front-rear separation distance between the edge protrusion and the inner locking part 210 may decrease as it goes downward.

Hereinafter, the operation of the terminal equipment 1 according to the first embodiment of the present disclosure will be described.

In the horizontal direction, the inner locking part 210 can be in the locking introduction state when the terminal 100 is in close contact with the bracket 20. If a user moves the terminal 100 downward with respect to the bracket 20 by a predetermined distance when the inner locking part 210 is in the locking introduction state, the inner locking part 210 can enter the locking state. If the user sequentially passes the opener P through the hole cover 140, the guide part 130, and the tampering part 120 to press the first inner locker 211 when the inner locking part 210 is in the locked state, the inner locking part 210 can enter the unlocked state. When the opener P comes into contact with the tampering part 120, the tampering function of the terminal 100 can be performed. In other words, when an outsider switches the locked state to the unlocked state, the tamper function of the terminal 100 is performed and thus information inside the terminal 100 can be protected from the outsider.

When the inner locking part 210 is in the unlocked state, the user can separate the terminal 100 from the bracket 20 by moving the terminal 100 upward from the bracket 20.

In addition to the above configuration, the first inner locker 211 may be provided in the terminal 100 and the second inner locker 212 may be provided in the bracket 20 according to a second embodiment of the present disclosure. Hereinafter, the second embodiment of the present disclosure will be described with reference to FIG. 6 to FIG. 8. Description of the second embodiment will be focused on differences from the above-described embodiment, and the same description and reference numerals refer to the above-described embodiment.

The first inner locker 211 may be connected to the inner frame 111b. The first inner locker 211 may include an inner locker member 211a and an inner elastic member 211b. The inner locker member 211a may be configured to be movable in the front and rear direction with respect to the inner frame 111b. When the inner locking part 210 is in the locking introduction state, the rear surface of the inner locker member 211a may be disposed to face the second inner locker 212. The inner locker member 211a may be disposed in a forwardly pressed state when the inner locking part 210 is in the locking introduction state. In addition, when the inner locking part 210 is in the locked state, the pressure applied to the inner locker member 211a is released and thus the inner locker member 211a can be moved backward by the restoring force of the inner elastic member 211b. When the inner locking part 210 is in the locked state, the upper end of the inner locker member 211a and the lower surface of the second inner locker 212 can come into contact with each other. In addition, when the inner locking part 210 is in the unlocked state, the inner locker member 211a is pressed by the opener P guided by the guide part 130 and thus can move backward with respect to the inner frame 111b. In other words, the inner locker member 211a can be moved forward by the opener P and can compress the inner elastic member 211b. In addition, the inner locker member 211a can be disposed at a position where a distance between the terminal 100 and an upper end of an inclined surface which will be described later is shorter than a distance between the second inner locker 212 and the terminal 100 in the locked state.

The inner elastic member 211b can be compressed when the inner locker member 211a is pressed forward. In addition, the inner elastic member 211b may provide a restoring force toward the inner locker member 211a such that the inner locker member 211a moves backward when the pressure applied to the inner locker member 211a is released. The front end of the inner elastic member 211b may be connected to the inner frame 111b and the rear end thereof may be connected to the inner locker member 211a. For example, the inner elastic member 211b may be a compressive coil spring.

A plurality of second inner lockers 212 may be provided and disposed apart from each other in the lateral direction. The second inner lockers 212 can be in contact with the upper side of the first inner locker 211 to prevent the first inner locker 211 from moving upward in the locked state.

The guide part 130 may be provided in the inner locker member 211a. For example, the guide part 130 may be provided at the center of the inner locker member 211a. The guide part 130 may be a recess formed to be recessed forward at the center of the inner locker member 211a. The inner surface of the guide part 130 may include an inclined surface. In other words, the rear surface of the guide part 130 may be formed as an inclined surface inclined forward. For example, the upper end of the inclined surface of the guide part 130 may be disposed more forward than the lower end. In addition, the inclined surface may be located between the plurality of second inner lockers 212 when viewed in the vertical direction. In other words, the opener can pass between the plurality of second inner lockers 212 while moving downward and can press the first inner locker 212 against the terminal 100 by being guided by the inclined surface.

In addition to the above configuration, the first inner locker 211 may be provided in the terminal 100 and the second inner locker 212 may be provided in the bracket 20 according to a third embodiment of the present disclosure. Hereinafter, the third embodiment of the present disclosure will be described with reference to Figs. to 11. Description of the third embodiment will be focused on differences from the above-described embodiments, and the same description and reference numerals refer to the above-described embodiments.

The first inner locker 211 may be supported by the terminal 100 such that at least a part thereof is moved by being pressed forward by the opener. In addition, the first inner locker 211 can provide a restoring force backward when pressed forward. In other words, the first inner locker 211 may be disposed such that the lower portion thereof is supported by the terminal 100 and the upper portion thereof is spaced apart from the terminal 100. In addition, the first inner locker 211 may be configured such that it can move toward the terminal 100 when the upper portion of the first inner locker 211 is pressed by any one of the opener P and the second inner locker 212 and can move in a direction away from the terminal 100 when the pressure is released. For example, the first inner locker 211 may be a leaf spring.

The first inner locker 211 can be defined as being pressed by the second inner locker 212 when the inner locking part 210 is in the locking introduction state. The first inner locker 211 is disposed below the second inner locker 212 and can be blocked from moving upward in the locked state. In addition, an upper end of the first inner locker 211 can come into contact with a lower end of the second inner locker 212 when the inner locking part 210 is in the locked state.

When the inner locking part 210 is in the unlocked state, the rear end of the first inner locker 211 and the front end of the second inner locker 212 can be spaced apart from each other. In other words, the first inner locker 211 is pressed against the terminal 100 by the opener P such that the upper end of the first inner locker 211 can be separated from the second inner locker 212 in the unlocked state. The first inner locker 211 is in a state in which it moves upward in the unlocked state.

The second inner locker 212 may have a shape protruding forward from the front of the bracket 20. In addition, a plurality of second inner lockers 212 may be provided and disposed apart from each other in the lateral direction. The second inner lockers 212 can be in contact with the upper side of the first inner locker 211 to prevent the first inner locker 211 from moving upward in the locked state. The plurality of second inner lockers 212 may be disposed such that an inclined surface of the guide part 130 which will be described later is positioned between the plurality of second inner lockers 212 when viewed in the vertical direction. In other words, the opener P can pass between the plurality of second inner lockers 212 while moving downward and can be guided by the inclined surface of the guide part 130 to press the first inner locker 211 against the terminal 100. The guide part 130 may be formed at the center of the first inner locker 211. In other words, the guide part 130 may be disposed above the first inner locker 211 and recessed toward the terminal 100 to form a stepped portion with respect to the first inner locker 211. For example, the guide part 130 may be a recess formed to be recessed forward at the center of the upper portion of the first inner locker 211. The guide part 130 may guide movement of the opener P in the vertical direction. In addition, an inclined surface may be formed on the rear surface of the guide part 130. For example, the upper end of the inclined surface of the guide part 130 may be disposed more forward than the lower end thereof such that the inclined surface is inclined forward.

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art can easily change or modify the disclosed embodiments based on the present specification, and it is clear that such changes or modifications also belong to the scope of the present disclosure.

What is claimed is:

1. A terminal apparatus assembly comprising:
   a terminal configured to be selectively fastened to a bracket; and
   a locking unit including an inner locking part configured to move with respect to the bracket such that the terminal and the bracket are fastened to or separated from each other,
   wherein the inner locking part is configured to move in one direction toward the bracket or the terminal when at least one portion of the inner locking part is pressed by an external force, the inner locking part being configured to move in a direction opposite to the one direction by a restoring force when pressing of the at least one portion of the inner locking part is released,
   wherein the inner locking part includes:
   a first inner locker protruding from the terminal in the one direction; and
   a second inner locker configured to be engaged with the first inner locker,
   wherein the terminal is configured to be fastened to the bracket when the second inner locker is engaged with the first inner locker,
   wherein the second inner locker is configured such that an upper portion thereof is disposed to be supported by the bracket, a lower portion of the second inner locker is disposed to be spaced apart from the bracket in the one direction, the second inner locker being configured to move toward the bracket when the lower portion of the second inner locker is pressed by either the external force or the first inner locker, the second inner locker being configured to move in a direction away from the bracket when pressing of the lower portion of the second inner locker is released.

2. The terminal apparatus assembly of claim 1, wherein the second inner locker is a leaf spring.

3. The terminal apparatus assembly of claim 1, wherein the inner locking part is configured to be in any one of a locked state in which the terminal and the bracket are fastened to each other and an unlocked state in which the terminal is separable from the bracket, and wherein the second inner locker is disposed such that a lower end thereof is in contact with an upper surface of the first inner locker in the locked state and the lower end of the second inner locker is pressed against the bracket by the external force to be spaced apart from the first inner locker in the unlocked state.

4. The terminal apparatus assembly of claim 3, wherein the inner locking part is configured to be in a locking introduction state in which the terminal is movable in a vertical direction with respect to the bracket,
   wherein the terminal is disposed higher in the locking introduction state than in the locked state and the unlocked state, and
   wherein the first inner locker comes into contact with the lower portion of the second inner locker and presses the lower portion of the second inner locker against the bracket in the locking introduction state.

5. The terminal apparatus assembly of claim 1, wherein a length of the first inner locker in the one direction decreases as the first inner locker extends downward.

6. The terminal apparatus assembly of claim 1, wherein the terminal includes:
   a frame supporting the second inner locker; and
   a guide part protruding from the frame in the one direction to guide a direction of movement of an opener for pressing the second inner locker,
   wherein the guide part is disposed above the second inner locker.

7. The terminal apparatus assembly of claim 6, wherein the second inner locker protrudes more than the guide part in the one direction.

8. The terminal apparatus assembly of claim 6, wherein the guide part includes a plurality of guide parts, and the plurality of guide parts are spaced apart from each other in a lateral direction to guide the direction of movement of the opener.

9. The terminal apparatus assembly of claim 8, wherein the terminal further includes a tampering part disposed between the plurality of guide parts.

10. The terminal apparatus assembly of claim 1, wherein the terminal includes:

a frame having an opener hole defined at an upper end thereof; and
a hole cover configured to open and close the opener hole, wherein the hole cover includes:
a cover body rotatably disposed at the upper end of the frame in a lateral direction perpendicular to the one direction to open and close the opener hole; and
a torsion spring configured to provide a restoring force for rotating the cover body such that the cover body closes the opener hole.

11. A terminal apparatus assembly comprising:
a terminal configured to be selectively fastened to a bracket; and
a locking unit including an inner locking part configured to move with respect to the bracket such that the terminal and the bracket are fastened to or separated from each other,
wherein the inner locking part is configured to move in one direction toward the bracket or the terminal when at least one portion of the inner locking part is pressed by an external force, the inner locking part being configured to move in a direction opposite to the one direction by a restoring force when pressing of the at least one portion of the inner locking part is released,
wherein the inner locking part includes:
a first inner locker supported by the terminal and movable in the one direction; and
a second inner locker disposed to be supported by the bracket,
wherein the second inner locker is configured to be engaged with the first inner locker such that the terminal and the bracket are fastened to each other, and
wherein the first inner locker includes:
an inner locker member configured to move toward the terminal when pressed by the external force; and
an inner elastic member configured to be compressed against the terminal by the inner locker member moving by being pressed by the external force, the inner elastic member being configured to be expanded by a restoring force when pressing by the external force is released to move the inner locker member in a direction away from the terminal,
wherein the inner locking part is configured to be in any one of a locked state in which the terminal and the bracket are fastened to each other and an unlocked state in which the terminal is separable from the bracket, and
wherein the inner locker member is disposed such that an upper end of the inner locker member comes into contact with a lower surface of the second inner locker in the locked state, and in the unlocked state, the inner locker member is pressed against the terminal by the external force and the upper end of the inner locker member is spaced apart from the lower surface of the second inner locker and compresses the inner elastic member.

12. The terminal apparatus assembly of claim 11,
wherein the inner locker member includes a guide part recessed from an outer surface toward the terminal and extending in a vertical direction to guide vertical movement of an opener for pressing the inner locker member.

13. The terminal apparatus assembly of claim 12,
wherein an inner surface of the guide part includes an inclined surface inclined such that a lower end of the inclined surface is further spaced apart from the terminal than an upper end of the inclined surface.

14. The terminal apparatus assembly of claim 13,
wherein the second inner locker includes a plurality of second inner lockers disposed spaced apart from each other in a lateral direction, and
wherein the inclined surface is disposed between the plurality of second inner lockers when viewed in the vertical direction.

15. The terminal apparatus assembly of claim 13,
wherein the inner locker member is disposed at a position where a distance between the upper end of the inclined surface and the terminal is shorter than a distance between the second inner locker and the terminal in the locked state.

16. A terminal apparatus assembly comprising:
a terminal configured to be selectively fastened to a bracket; and
a locking unit including an inner locking part configured to move with respect to the bracket such that the terminal and the bracket are fastened to or separated from each other,
wherein the inner locking part is configured to move in one direction toward the bracket or the terminal when at least one portion of the inner locking part is pressed by an external force, the inner locking part being configured to move in a direction opposite to the one direction by a restoring force when pressing of the at least one portion of the inner locking part is released,
wherein the inner locking part includes:
a first inner locker, at least a one part of the first inner locker being supported by the terminal to be movable in the one direction by the external force; and
a second inner locker configured to be engaged with the first inner locker such that the terminal and the bracket are fastened to each other,
wherein the first inner locker is configured such that a lower part of the first inner locker is supported by the terminal, and an upper part of the first inner locker is spaced apart from the terminal in the one direction, the first inner locker being movable toward the terminal when the upper part of the first inner locker is pressed by any one of the external force and the second inner locker, the first inner locker being movable in a direction away from the terminal when pressing of the upper part of the first inner locker is released.

17. The terminal apparatus assembly of claim 16,
wherein the inner locking part is configured to be in any one of a locked state in which the terminal and the bracket are fastened to each other and an unlocked state in which the terminal is separable from the bracket, and
wherein an upper end of the first inner locker is in contact with a lower end of the second inner locker in the locked state, and
wherein the first inner locker is pressed by an external force against the terminal and the upper end of the first inner locker is spaced apart from the second inner locker in the unlocked state.

18. The terminal apparatus assembly of claim 16,
wherein a guide part recessed toward the terminal to form a stepped portion with respect to the first inner locker, the guide part being configured to guide a vertical movement of an opener for pressing the first inner locker, is the guide part being disposed at the upper part of the first inner locker.

* * * * *